(12) United States Patent
McMahon et al.

(10) Patent No.: US 9,189,244 B2
(45) Date of Patent: Nov. 17, 2015

(54) METHODS AND SYSTEMS FOR MANAGING DATA SERVICE SPECIFICATIONS

(75) Inventors: Richard McMahon, Edinburgh (GB); Lea Savage, Edinburgh (GB)

(73) Assignee: Adobe Systems Incorporated, San Jose, CA (US)

( * ) Notice: Subject to any disclaimer, the term of this patent is extended or adjusted under 35 U.S.C. 154(b) by 1137 days.

(21) Appl. No.: 12/542,964

(22) Filed: Aug. 18, 2009

(65) Prior Publication Data

US 2014/0289702 A1    Sep. 25, 2014

(51) Int. Cl.
| | |
|---|---|
| G06F 17/20 | (2006.01) |
| G06F 3/00 | (2006.01) |
| G06F 9/44 | (2006.01) |
| G06F 21/62 | (2013.01) |
| G06F 21/60 | (2013.01) |
| G06F 17/30 | (2006.01) |

(52) U.S. Cl.
CPC .. G06F 9/44 (2013.01); G06F 8/30 (2013.01); G06F 17/30 (2013.01); G06F 21/60 (2013.01); G06F 17/3092 (2013.01); G06F 2221/2141 (2013.01)

(58) Field of Classification Search
None
See application file for complete search history.

(56) References Cited

U.S. PATENT DOCUMENTS

| | | | | |
|---|---|---|---|---|
| 6,061,697 | A * | 5/2000 | Nakao | 715/229 |
| 6,467,080 | B1 * | 10/2002 | Devine et al. | 717/123 |
| 6,941,459 | B1 * | 9/2005 | Hind et al. | 713/167 |
| 6,990,629 | B1 * | 1/2006 | Heaney et al. | 715/200 |
| 7,200,816 | B2 * | 4/2007 | Falk et al. | 715/762 |
| 7,389,473 | B1 * | 6/2008 | Sawicki et al. | 715/255 |
| 7,430,711 | B2 * | 9/2008 | Rivers-Moore et al. | 715/221 |
| 7,526,753 | B2 * | 4/2009 | Spencer et al. | 717/109 |
| 7,665,064 | B2 * | 2/2010 | Able et al. | 717/117 |
| 7,739,292 | B2 * | 6/2010 | Falk et al. | 707/760 |
| 8,032,860 | B2 * | 10/2011 | Piehler et al. | 717/110 |
| 2004/0177335 | A1 * | 9/2004 | Beisiegel et al. | 717/102 |
| 2004/0199516 | A1 * | 10/2004 | Thames et al. | 707/100 |

(Continued)

FOREIGN PATENT DOCUMENTS

AU          2003200396 B1 *  2/2004

OTHER PUBLICATIONS

Christensen, Erik, Francisco Curbera, Greg Meredith, and Sanjiva Weerawarana. "Web Services Description Language (WSDL) 1.1" W3C Note Mar. 15, 2001. pp. 1-17. Retrieved from http://www.w3.org/TR/2001/NOTE-wsdl-20010315 on Oct. 25, 2012.*

(Continued)

*Primary Examiner* — Don Wong
*Assistant Examiner* — Erika Kretzmer
(74) *Attorney, Agent, or Firm* — Kilpatrick Townsend & Stockton LLP

(57) ABSTRACT

Development of network-based computing resources can be enhanced through the use of methods and systems that allow for controlled editing of specification data used in an automated build process in a user-friendly way. Particularly, one or more software tools can be used to allow editing of application programming interfaces (API) specification data such as Web Application Description Language (WADL) or Web Service Description Language (WSDL) and/or to allow editing of elements used to generate software development kit (SDK) documentation relied upon by an automatic build system. For example, a first interface may be configured for editing parameter values and parameter types related to functionality of the API while a second interface may restrict use to editing descriptive aspects of the API such as the SDK.

19 Claims, 8 Drawing Sheets

(56) References Cited

U.S. PATENT DOCUMENTS

| | | | | |
|---|---|---|---|---|
| 2004/0261059 | A1* | 12/2004 | Spencer et al. | 717/120 |
| 2005/0114771 | A1* | 5/2005 | Piehler et al. | 715/536 |
| 2005/0160359 | A1* | 7/2005 | Falk et al. | 715/513 |
| 2005/0183006 | A1* | 8/2005 | Rivers-Moore et al. | 715/513 |
| 2005/0256882 | A1* | 11/2005 | Able et al. | 707/10 |
| 2006/0218102 | A1* | 9/2006 | Gibson et al. | 705/80 |
| 2007/0073712 | A1* | 3/2007 | Falk et al. | 707/10 |
| 2007/0226604 | A1* | 9/2007 | Chalasani et al. | 715/500 |
| 2008/0228742 | A1* | 9/2008 | Zhang et al. | 707/4 |
| 2009/0013245 | A1* | 1/2009 | Cudich et al. | 715/234 |

OTHER PUBLICATIONS

Berners-Lee, T and C Connolly. "Hypertext Markup Language-2.0" RCF 1866, W3C. Nov. 1995. pp. 1-10 and 40-41.*

"REST Describe," Apr. 26, 2007, available at http://blog.tomayac.de/index.php?date=2007-04-26&time=18:05:54&perma=REST+Describe+first+.html (last accessed May 12, 2009).

Hadley, "Web Application Description Language" (WADL), Nov. 9, 2006, available at https://wadl.dev.java.net/wadl20061109.pdf (last accessed Jun. 19, 2009).

"Introducing Perforce," Jul. 2009, available at http://www.perforce.com/perforce/doc.091/manuals/intro/intro.pdf (last accessed Aug. 13, 2009).

"Apache Ant User Manual," Date Unknown, available at http://ant.apache.org/manual/index.html (last accessed Aug. 13, 2009).

"CruiseControl Overview," Date Unknown, available at http://cruisecontrol.sourceforge.net/overview.html (last accessed Aug. 13, 2009).

Ian Paterson, Richard McMachon, James Boag, U.S. Appl. No. 12/542,893, titled "Methods and Systems for Data Service Development," filed Aug. 18, 2009.

* cited by examiner

600

Version
602

Documentation URL
604

606  Port
608  Username
610  Password

Versions   New API   Documentation

708   Name        Title          Actions
AddRating   "Add Rating"      Edit  Destroy
CreateAcct  "Create Account"  Edit  Destroy
GetRating   "Get Rating"      Edit  Destroy

Figure 7

METHODS AND SYSTEMS FOR MANAGING DATA SERVICE SPECIFICATIONS

TECHNICAL FIELD

The disclosure below generally relates to development of network-based computing resources, particularly to development of data services.

BACKGROUND

Web services and web applications include software systems that support machine-to-machine interaction over a network. For example, a web service or web application may comprise one or more application programming interfaces (APIs) that can be accessed over a network and executed on a remote system hosting the requested service or application. Typically, available functionality is specified in an API and corresponding documentation for use in invoking the web service. For instance, some web services may be defined using the Web Application Description Language (WADL), which is an XML-based format that describes services in a machine-processable way and/or the Web Service Description Language (WSDL), which is an XML format for describing web services, such as by defining ports and messages.

Development of a web service or web application can raise logistical challenges. For example, the web service/application may be developed to include a software development kit (SDK) for clients that includes detailed reference documentation, client libraries for invoking the web service/application in target languages, and sample applications/code. This effort may be difficult to coordinate among multiple parties responsible for various aspects of the project.

As an example, in some existing development workflows, technical writers are not permitted direct access to WADL or WSDL data. Instead, they may deal indirectly with data that is difficult to edit and which may be out of date. Furthermore, there may be some delay between when the technical writer makes a contribution and when the changes to the SDK can be seen by the writer. Similar issues may occur for other personnel, such as software engineers wishing to add or update an API.

SUMMARY

Development of network-based computing resources can be enhanced through the use of methods and systems that allow for controlled editing of specification data used in an automated build process in a user-friendly way. Particularly, one or more software tools can be used to allow editing of API specification data such as WADL or WSDL and/or to allow editing of elements used to generate SDK documentation relied upon by an automatic build system. This editing ability may lead to improved workflows whereby development personnel may have more direct access to portions of the API specification and may readily see the results of their efforts.

Embodiments include a method, comprising accessing specification data for a data service, the specification data defined in a first format. For example, the specification data may comprise one or more WADL files or constituent files comprising text and markup used to generate SDK documentation. The method can comprise identifying a portion or portions of the specification data to be edited, such as particular files or portions thereof. The identified portion(s) can be converted into a second format and an interface for editing the specification data in the second format can be generated. The method may comprise receiving data representing an edited version of the specification data in the second format—for example, the editing interface may return the edited version. Based on the received data, the specification data in the first format can be updated, and the method can comprise triggering an automated build to update some or all components of the data service using the specification data as updated.

Embodiments include computing systems and computer-readable media comprising program code for providing aspects of the present subject matter. These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

FIG. 6 is a diagram illustrating an example of an interface for defining a new SDK.

FIG. 7 is a diagram illustrating an example of an interface for viewing/managing APIs and documentation of an SDK.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Figure 1:
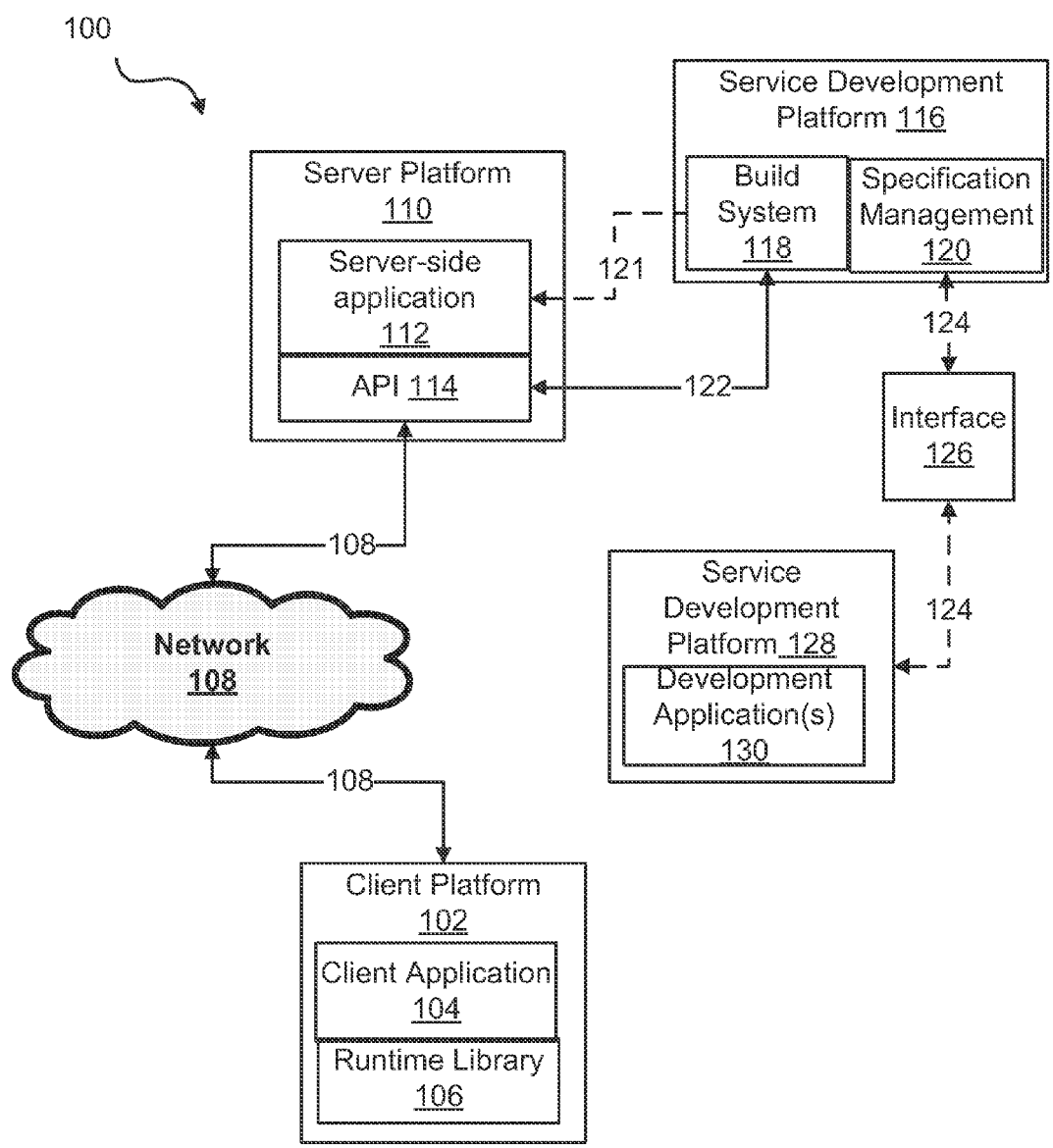
FIG. 1 is a diagram illustrating an exemplary development and use environment for a data service.

FIG. 1 is a diagram illustrating an exemplary development and use environment 100 for a data service. In this example, a representative client computing platform 102 utilizes a client application 104 and corresponding runtime library 106 to access a data service provided by server computing platform 110 via one or more networks 108. Each computing platform may, for example, comprise one or more processor-based computing devices. The client computing platforms are "clients" with respect to the data service; for instance, the clients may be devices used by one or more users or may comprise servers that are themselves providing another data service that relies on functionality provided by the data service available from computing platform 110.

The data service may, for example, comprise a web service provided by one or more server-side applications 112 whose functionality is invoked via application programming interface (API) 114. For instance, the web service may be implemented as a representational state transfer (REST) architecture in which the clients provide calls to remote methods via HTTP requests that can include one or more (and typically several) parameters using a format specified in documentation for API 114. In response, server-side application(s) 112 can return responses using a structure/format also specified in documentation for API 114 or elsewhere. Although a single API is illustrated for the sake of simplicity, a data service may implement any number of APIs.

In this example, client platform 102 utilizes client application 104 and runtime library 106 to invoke the web service. Although a single client is shown here, the web service may support multiple clients and each client may use different programming languages and runtime libraries. This example depicts library 106 at client 102. For example, a library may be maintained separately (e.g., dynamically linked at runtime). However, in some embodiments, a library may or may not reach clients 102—for example, a library 106 may be incorporated into a client application 104 at the time of development and thus may not be separately provided to a client.

The entity or entities that provide the web service may utilize one or more service development platforms 116 to execute one or more applications, programs, or components collectively illustrated as build system 118 to create and maintain the server-side application(s) 112 that provide the web service functionality. This is conceptually illustrated by dotted line 121. Service development platform 116 may comprise the same server or a different server that actually executes server-side application(s) 112.

In some embodiments, the web service provider may specify the functionality of the web service via WADL or WSDL as noted above. Build system 118 can be used to automatically generate suitable code for providing server-side application(s) 112 based on the WADL, WSDL, or another specification. In some embodiments, build system 118 may support automatic testing and/or generation of software development kit (SDK) artifacts for use by one or more users (not shown) of client application 104.

For example, SDK artifacts can include runtime libraries 106 for one or more languages to facilitate the development process for distribution with client applications for use at runtime and/or for use by users writing standalone client applications. Additionally, API documentation can be included to define the web service in terms of input and output parameters and syntax. Finally, additional reference documentation can be provided that includes sample code and sample input/output data (also referred to as "wiretraces").

Build system 118 may also generate code to test aspects of server-side application(s) 112. Thus, connection 122 is illustrated to represent build system 118 invoking the functionality of server-side application 112 via API 114 by running test code. When the data service is updated, build system 118 may publish the latest version of server-side application 112 and API 114 to server platform 110. Additionally, the latest SDK artifacts and test results may be made available to authorized users of server platform 110 or may be made available at development platform 116 for internal use. In practice, build system 118 may perform tests using a separate test build of the web service rather than the "production" version (if any).

In accordance with one or more aspects of the present subject matter, build system 118 can also include or be used alongside a specification management system 120 to allow users such as developers to edit the WADL, WSDL, or other specification data used by build system 118 to benefit from the infrastructure supporting the automated build process. For example, as conceptually indicated by dashed lines 124, portions of the specification data can be converted from a first format to a second format for use with an editing interface 126, which can be provided using one or more service development platforms 128 executing suitable development application or applications 130.

In some embodiments, interface 126 is provided via an HTML page with code for providing a JavaScript-based or other text editor and application 130 is a browser or other application that can render the HTML page. For instance, the TinyMCE Javascript WYSIWYG editor (available at http://tinymce.moxiecode.com) can be used but with formatting options adjusted to limit the ability of end users to introduce unwanted formatting. In some embodiments, the capabilities of the text editor can be customized based on user permissions.

In this example, build system 118 and specification management system 120 are provided via service development platform 116, which is separate from service development platform 128. For example, service development platform 116 may comprise a server maintained by the entity responsible for developing the web service, while one or more service development platforms 128 each represent a workstation interfaced to development platform 116 for use by developers associated with the entity or outside the entity. However, this is meant to be illustrative, and any suitable development architecture can be used.

As a particular workflow example, specification management system 120 may allow a technical writer using platform 128 controlled access to edit documentation that is embedded in the specification data or otherwise maintained with the web service without allowing access to other parts of the specification data.

As was noted above, the entity providing a web service may be hesitant or unable to allow a technical writer full access to WADL files for the service due to the risk that the technical writer may inadvertently alter portions of the WADL specification outside his or her assigned task. Additionally or alternatively, it may be difficult or impossible to allow the technical writer direct access to build system 118, especially if the technical writer is an independent contractor or is otherwise "outside the company." Thus, as noted earlier, in a conventional development workflow, the technical writer may have been forced to rely on copies of the WADL files received indirectly. The files might not be representative of the most up-to-date specification and the technical writer may not have the opportunity to view the results of his or her work as integrated into the web service/documentation.

Instead, in accordance with aspects of the present subject matter, controlled access to the WADL data can be facilitated by specification management system 120. The technical writer may be provided with current data and a more user friendly interface for performing his or her assigned portion of the task. Once he or she has updated his or her portion of the data, the updates can be merged into the WADL specification and used in the automated build process, with the technical writer able to view the results as published to the SDK after the next build.

As another example, specification management system 120 may allow a software engineer to edit portions of the specification data that define API functionality via a more user-friendly interface. For example, rather than using a separate XML editor and parsing the entire WADL file for a web service, the developer may be presented with an HTML-based page for only a particular API or portion thereof with form inputs (e.g., text boxes, drop-down menus, toggle switches) for defining and describing parameters. Similar to the case of the technical writer, the developer may be able to view the results of his or her work after the API specification data input via HTML page 126 is merged into the WADL specification and the next build is performed.

Portions of the specification data may be edited as noted above to change definition data for APIs. However, other portions of the specification data may also be edited. As an example, the data service may include one or more documentation pages that can be dynamically generated by an automated build system using constituent files comprising text and markup. For instance, a documentation page listing all available APIs may be generated using text comprising headings and introductory text, with API titles inserted based on identifying the name of each API defined in a corresponding WADL file. One or more portions of the constituent files may be selected, parsed, and converted for editing via the HTML interface in addition to or instead of WADL files.

Returning to the example of the technical writer, he or she may be able to enter changes to the introductory paragraphs and headings via an HTML formatted version of a portion of the constituent files via the editing interface. However, the task of defining tags or markup for inserting the WADL information may be left to another designer, and so that portion of the constituent files may not be presented to the technical writer via the editing interface.

Figure 2:
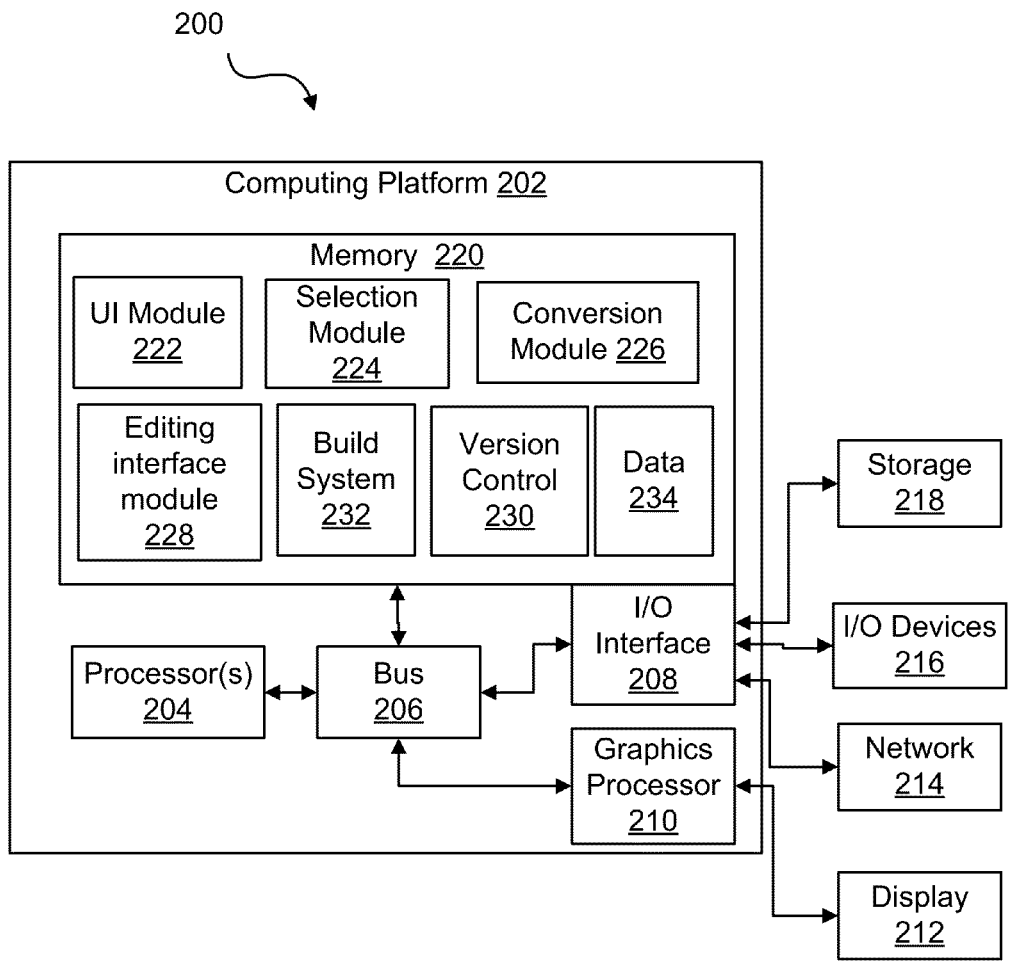
FIG. 2 is a diagram illustrating an example of a computing device configured by software components to provide a SDK build system with support for specification management in accordance with the present subject matter.

The computer platforms of FIG. 1 may comprise computing devices with one or processors configured by software tangibly embodied in computer-readable media (e.g., memory) accessible to the processor(s). FIG. 2 provides an example of a computing platform 200 configured to provide a build system but a similar hardware architecture can be used for any or all of client platforms 102, server platform 110, service development platform 116, and service development platform 128.

Computing platform 202 comprises one or more processors 204 connected via a bus 206 to a memory 220. Additionally, bus 206 is connected to I/O interface 208 and graphics processor 210. Graphics processor 210 drives one or more displays 212 that can be used to view output of computing platform 202. I/O interface 208 provides connections to networking components 214 (e.g., local area and/or wide-area connections), I/O devices 216 (e.g., mouse, keyboard, speakers, and other input and output devices), and storage 218 (e.g., computer-readable media such as disk drives).

Memory 220 represents local and/or remotely-accessible storage such as RAM. In this example, components for developing a data service embodied in memory and provide specification management functionality in accordance with aspects of the present subject matter. Particularly, the components used to provide specification management functionality in this example include a user interface module 222, a selection module 224, a conversion module 226, an editing interface module 228, and a version control module 230. Additional components include a build system 232 and data 234, which is meant to be representative of WADL files and other specification data relied upon in operation of the other components. This data may, of course, be accessed from other resources (e.g., databases, file stores).

Build system 232 can include a code generator module(s), test code generator module(s), documentation generator module(s), test code execution module(s), and other components that can be used to implement an automated build process based on specification data (e.g., WSDL, WADL, and/or other specification data) as wet as output code, test case results, and executable files for use by developers. Additional details of exemplary build systems can be found in U.S. Pat. No. 8,949,792, titled "Methods and Systems for Data Service Development," by Ian Paterson, Richard McMahon, and James Boag, filed the same day as the current application, and which is incorporated by reference herein in its entirety.

Memory 220 may include additional components and applications such as an operating system and the like. In this example, the build and specification management system is depicted as locally hosted with respect to I/O devices 216 and display 212. However, in some embodiments, the build system is hosted on one or more servers interfaced to workstations that handle input/output tasks.

User interface module 222 can be configured to provide documentation for data service, and may include a web server configured to provide a plurality of web pages documenting an SDK for the web service generated using WADL, WSDL, and/or other specification data. For example, the web pages can comprise at least one definition page corresponding to an API and at least one documentation page for the data service. User interface module 222 can also generate appropriate pages for user logins, viewing reports of the build and editing process, and otherwise administering the automated build system and specification management system.

Selection module 224 can be configured to identify a portion in the specification data for editing. As an example, selection module 224 may be configured to locate an appropriate WADL file or constituent file containing concept documentation for generating documentation pages and locate one or more portions therein containing data to be edited. For instance, the selection module may be responsive to selection of an edit command in the definition page for an API to identify the portion in a structured markup file corresponding to the API. On the other hand, if an edit command is received specifying a documentation page, the selection module may identify the portion in a constituent file comprising text and markup for use by the automated build system in generating the documentation page.

In some embodiments, selection is based at least in part on user roles. For instance, user interface module 222 may provide a login or authentication mechanism to identify a user who desires to edit the specification data. Permission data can be accessed by the components of the specification management system to control the editing process. For example, selection module 224 may access permissions for the user to determine which, if any, files in the specification data can be edited by the user. The permission data may be used to identify particular portions of files and/or editing capabilities.

As an example, a technical writer may be permitted to edit descriptive text embedded in WADL files, but not to edit portions of the WADL files defining requests, parameters, error codes, or flags. Accordingly, selection module 224 may only select portions of the WADL file having <doc> tags for conversion. A developer may have permission to edit any portion of the WADL file, and so when the developer requests to edit the file, the entire WADL file may be selected for conversion.

Conversion module 226 can be configured to convert the selected portion(s) from a first format into a second format. As an example, XML of a WADL file may be converted to HTML for editing. As another example, text and markup in a constituent file may be converted to formatted HTML for editing.

Editing interface module 228 can be configured to provide an interface to allow editing of the selected portion(s) while in the second format. As an example, editing interface module 228 may utilize the HTML provided by conversion module 226 to generate an HTML page readable by a browser. The page may include an embedded text editor; as an example, a WYSIWYG text editor can be included using JavaScript. Additionally or alternatively, appropriate selection mechanisms (e.g., dropdown menus, checkboxes, form fields, etc.) can be included in the page to simplify the editing process.

In some embodiments, editing interface module 228 configures the functionality of the interface based on user roles. For instance, the formatting capabilities of the text editor may be restricted to prevent a technical writer (or other user) from introducing formatting (e.g., headers, text colors, etc.) inconsistent with a defined style for the SDK being edited. These restrictions may be defined in terms of a style sheet or other configuration file accessible by editing interface module 228.

As another example, selection mechanisms may be locked for certain fields. For instance, dropdown menus and form fields used to define parameter values and parameter types may be displayed, but locked from editing, for a technical writer. On the other hand, form fields for inserting descriptive text may be freely editable for the technical writer. A developer accessing the same page may be able to edit the parameter types and values along with the descriptive text. Module 228 may also be responsive to commands received from the interface indicating that editing is complete. For example, the HTML page may include a "save" button that results in a POST request that is received by module 228.

Editing interface module may 228 may also include appropriate server-side components for responding during the editing process. For example, in some embodiments, the editing interface includes code for suggesting a parameter value for inclusion in the specification data. For instance, AJAX techniques may be used to identify user input in a field and provide a request to editing interface module 228 or responder 234 for a suggested value based on the field and input provided. The suggested value can be determined by consulting other fields having the same or a similar name or other parameters and providing the value(s) associated with the other field or fields.

As a particular example, a user may begin defining a parameter value already defined in one or more other existing APIs. For instance, the user may be defining a parameter value for a "request" field describing the syntax for invoking a "version" API that provides the current version of a web service, and one or more web services supported by the specification management system may already have the same API. AJAX code in the editing interface can provide the API name ("version" in this example) and parameter being defined ("request=") and in response, module 228 or 234 can check existing APIs for previous input. For instance, module 228/234 may identify a parameter value such as ("request=/{service name}/version/current") and provide it to the editing interface for suggestion to the user.

AJAX may also be used to provide spell-checking capability for editing components of the user interface. For example, if a Javascript WYSIWYG editor is used to allow editing of documentation, the editor can be configured to make a call to the server during the spell-check operation. The editor can make a call to the server-side components for a dictionary of terms or other working data for use in a spell-check operation and verify spelling (and/or grammar or syntax) locally or can simply submit words to the server for spelling/grammar/syntax to be verified at the server. The server can be configured to track which words are corrected by user input, added to the dictionary, and so on for use in future spell check operations. The dictionary may be specific to the data service or may be maintained based on data from multiple different data services supported by the server.

Version control module 230 is configured to identify a desired change to the specification data based on one or more edits received via the editing interface, adjust the specification data, and trigger an automated build process based on the specification data as adjusted. For example, version control module 230 may be provided via a version tracking system, automated build system, and code for identifying and merging changes into the specification data.

As an example, a user may indicate that editing via the editing interface is complete. The editing interface module 228 may return the portion of the specification data as edited in the second format (e.g., HTML as edited) and returned by the interface for conversion by module 226. Module 226 may use an appropriate transformation technique to convert the edited HTML back into the source format (e.g., XML or text). Using data identifying the original source for the portion of the specification data, version control module 230 can create a new version of one or more files of the specification data that represents the updates. As an example, if the <doc> portion of a WADL file is updated, the changes can be merged into the <doc> portion of the WADL file. Version control module 230 may also provide suitable output for indicating changes between versions. For example, newly-added or deleted items may be indicated using colors, formatting (e.g., underlines, strikethroughs).

Version control module 230 can trigger a build of some or all portions of the data service. For example, if changes are made only to constituent files used to generate documentation, then version control module 230 may trigger a build to assemble the documentation. As another example, if a subset of APIs are changed, then only the portions of the SDK related to the changed APIs may be re-built.

Figure 3:
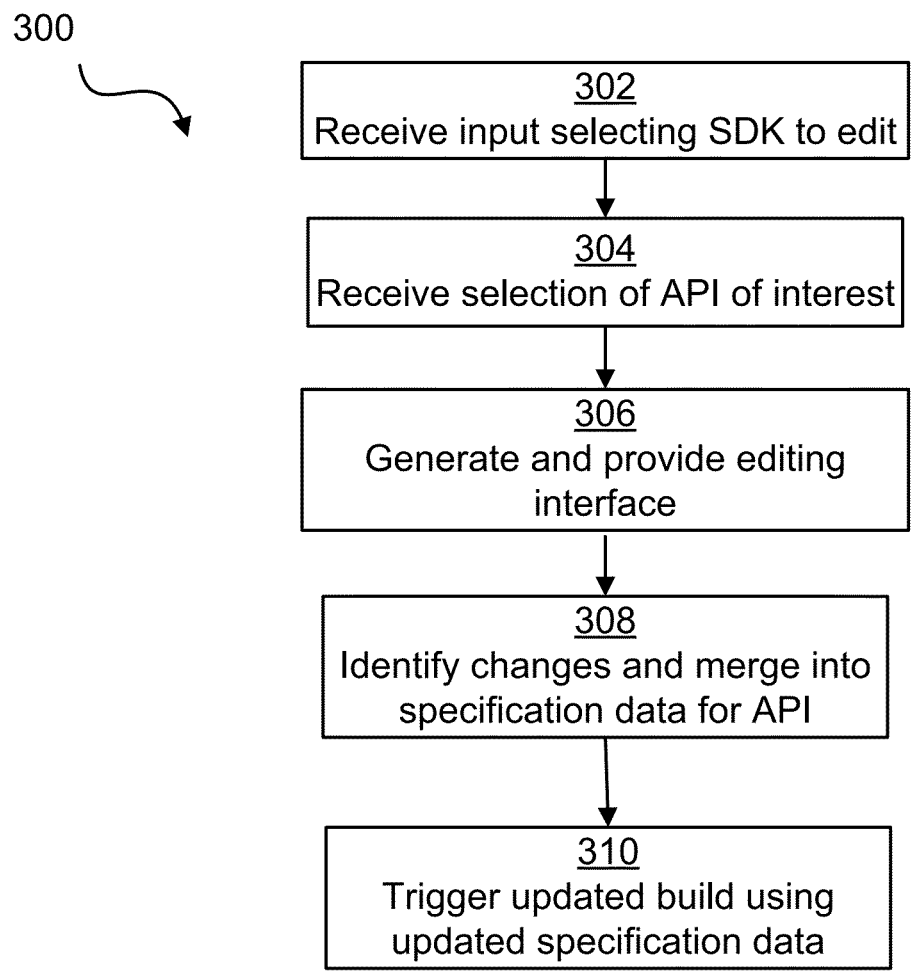
FIG. 3 is a flowchart illustrating steps in an exemplary overall workflow that includes controlled editing of specification data.

FIG. 3 is a flowchart illustrating steps in an exemplary overall workflow 300 that includes controlled editing of specification data. At block 302, the specification management system receives input selecting an SDK to edit. For example, the build system may publish SDKs to a repository with a web-based front end comprising a plurality of web pages with both definition pages for APIs and documentation pages for the web service. A user may navigate through the pages to an SDK of interest. At block 304, the system receives selection of an API of interest. As an example, each SDK may feature a list of available APIs.

Assuming the user has some editing permissions, the user may be presented with an "edit" button that triggers a controlled editing process. This is represented at block 306, where the system presents an editing interface to the user. For example, as was noted above, an HTML page may be generated based on a portion of the specification data, with the HTML page including form-based input mechanisms and/or a WYSIWYG editor. The user can then provide suitable input to adjust the specification data.

At block 308, the changes made by the user are merged into the API specification or other specification data. Then, at block 310, an updated build is triggered. For example, the updated specification data may be used as the basis of a new version that is built using the automated build system and then published to an appropriate portion of the repository. Then, the user may view the SDK as updated or, if the build fails, appropriate error messages can be provided.

Figure 4:
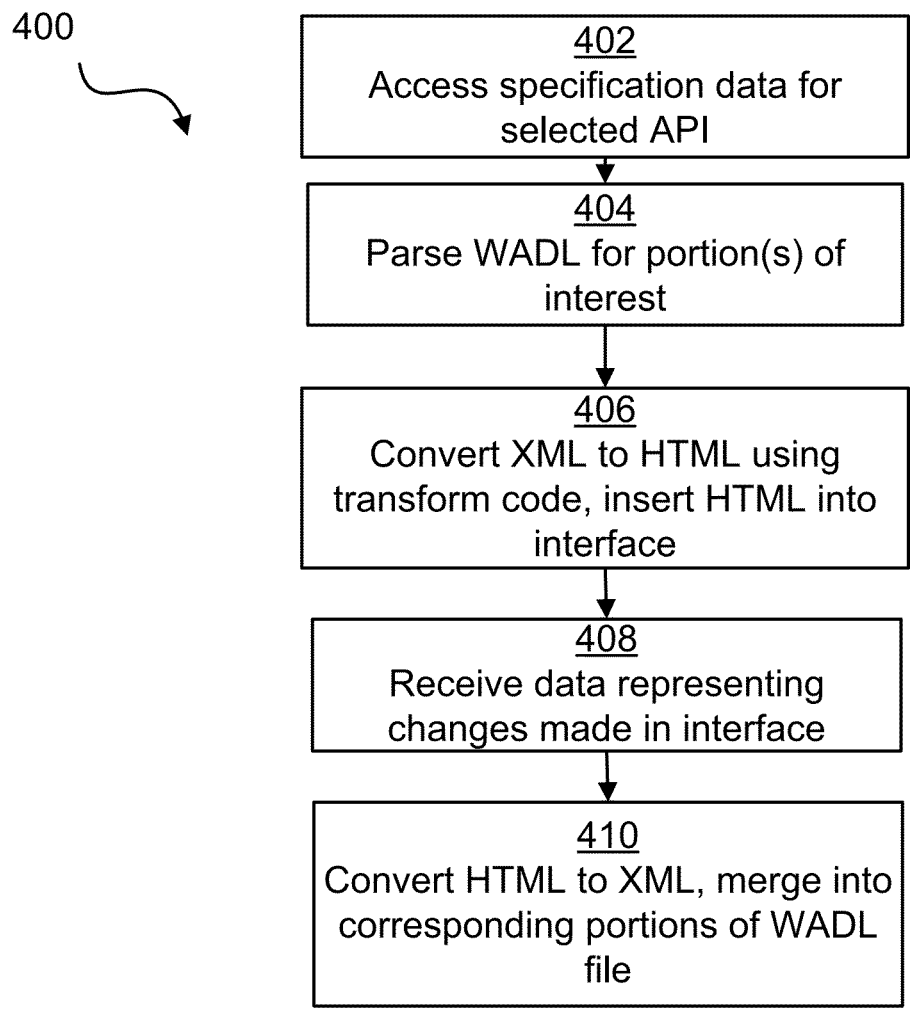
FIG. 4 is a flowchart illustrating steps in an exemplary method for generating and using an editing interface.

FIG. 4 is a flowchart illustrating steps in an exemplary method 400 for generating and using an editing interface. Block 402 represents accessing specification data comprising a WADL file for a selected API. Block 404 represents parsing the XML to locate one or more portions of interest. The portion of interest may be determined based on a specific command and/or permissions linked to a user's role.

For example, in some embodiments an SDK definition page features an "edit documentation" button which, when triggered, causes the XML parser to search for <doc> tags in the WADL file and convert the documentation information into HTML for editing. As another example, metadata for the specification management system may indicate that the user is a technical writer, triggering conversion of <doc> elements for editing but preventing conversion of other portions of the WADL file. As another option, some, but not all of the WADL file may be converted according to some other criterion.

In some embodiments, portions of the WADL or other definition file are parsed to identify portions of the document object model (DOM) using Xpath expressions. For instance, portions of interest can be identified using a document structure specified in an XML schema. For example, portions of the WADL or other file representing API paths (e.g., /comments/{commentid}.xml), preferred HTTP methods (e.g., GET/POST/PUT), parameters, and descriptive preamble can be identified by parsing the WADL file based on the XML schema.

In some embodiments, a WADL or other definition file can include markup intended for use by components that generate an editing interface. For example, automatic code generation may depend on one or more flags that can be edited in the user interface. Particularly, the HTML preamble can include XML elements corresponding to the flags as noted below:

```
<wadl:doc title='Copy Resource'>
  <html:p>
    Copies a resource from one location within DataService to another.
    Specify the source and destination as absolute paths on the same
    DataService service. The source is copied without change to the
    destination.
  </html:p>
  <html:ul id='flags'>
    <html:li id='ticket_needed'>
      <html:strong>Ticket Needed</html:strong>
      :yes
    </html:li>
    <html:li id='ssl_needed'>
      <html:strong>SSL Required</html:strong>
      :no
    </html:li>
    <html:li id='supports_metadata'>
      <html:strong>Uploading Metadata</html:strong>
      :no
    </html:li>
  </html:ul>
</wadl:doc>
```

In the example above, the flags are intended for consumption by both code generation components that recognize the unordered list id='flags' and the user interface components, which when presenting an interface for setting the flags can generate a series of drop-down selection boxes. The elements with "html:" preambles can be readily converted to standard HTML by removing the "html:" preambles.

Block 406 represents the conversion process. For instance, any suitable conversion technique may be used to convert the structured XML of the portion(s) of the WADL file into HTML for editing. As an example, suitable XSL or XSLT code may be used to obtain HTML-formatted data by removing XML tags and including suitable HTML tags, if not present within the XML already. For example, the tag <html:p> in the example above can be converted to simply <p> when this portion of the WADL file is to be edited; when editing is complete, the <p> tag can be returned to <html:p> for updating the WADL file. Of course, more complex conversions may be needed and can be provided for in the XSL, XSLT, or other transformation components.

Block 408 represents receiving changes made in the interface. This may, for example, as a result of edits made by a user at the user's computing platform that are then communicated to the specification management system. For example, if a JavaScript WYSIWYG editor is provided, then a "save" command in the JavaScript editor may provide a POST request to the specification management system which is interpreted as an indication that editing is complete. As another example, a user may make selections from drop-down menus, check, uncheck, or toggle switches, or fill in form fields and then press an onscreen "commit" or other button to indicate that editing is complete.

Block 410 represents converting the HTML as edited into XML and merging the changes into the WADL file. For example, counterpart XSL or XSLT files may be used to obtain a suitable XML data structure by removing HTML tags and/or placing the HTML tags within suitable XML tags for the WADL file. The original specification data can be parsed to determine where the changes should be made, e.g., to locate corresponding portions of the WADL file, and update the portions to reflect the user's intended change or changes.

In the example above, the specification data comprised one or more WADL files. However, the same workflow can be used in editing constituent documents used to generate documentation for the data service as part of the build process. For the sake of clarity, such a process is discussed below.

Figure 5:
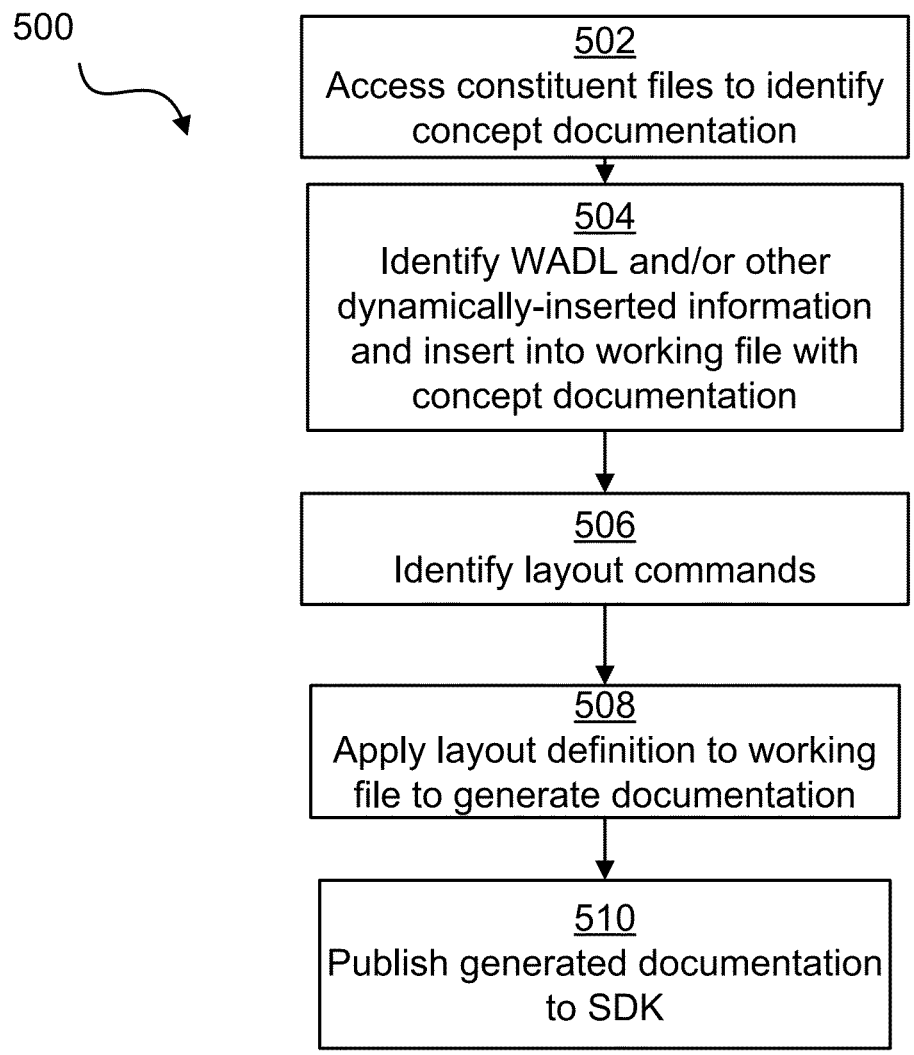
FIG. 5 is a flowchart illustrating steps in an exemplary method for generating document components.

FIG. 5 is a flowchart illustrating steps in an exemplary method 500 for generating document components. For example, documentation pages in the SDK browser may include base text in constituent files, with the base text augmented by layout components (e.g., tab interfaces, navigation sidebars, and the like) and dynamically-updated text generated from other portions of the specification data (e.g., from the WADL files). Block 502 represents accessing the concept documentation comprising "fixed" portions of text, such as descriptive paragraphs for particular APIs, more general text such as "getting started" information for the SDK. For instance, the basic text may be editable in a manner similar to that noted above in FIG. 4. However, the concept documentation may be stored in any suitable format—for instance, rather than using XML, text files may be used with markup or tags for applying layout and formatting to the text.

In any event, at block 504 WADL-derived information is identified and inserted into a working file along with the text from the concept documentation. For example, the concept documentation may include tags or placeholders indicating where information from one or more WADL files is to be included. As a particular example, a block of text may describe the overall functionality of the web service and reference a list of available APIs. A tag or indicator can be included beneath the introductory paragraph to indicate that a list of available APIs is to be generated from the titles of the WADL files specified for the web service. Accordingly, as additional APIs are defined via corresponding WADL files, the list will be updated with successive builds.

Block 506 represents identifying layout commands included in the concept documentation. For example, the concept documentation may indicate that the text of the concept documentation (and dynamic content, if any) is to be included in a particular tab defined in a layout file. Layout information may be defined in one or more XML files or style sheets, for instance.

Based on the layout information and working file of concept documentation text and WADL-derived information, one or more documents can be generated at block 508. For example, the layout definition files can be parsed and used to generate HTML code (e.g., using suitable XSL files) to provide a navigation framework and the content of the page can be inserted.

At block 510, the generated HTML page can be published along with other portions of the SDK. As noted earlier, method 500 may occur as part of a build process triggered by changes to the API specification. However, the documentation may be re-built even in the absence of API changes—for example, changes to the concept documentation or related specification data (e.g., updates to the XSL files to reflect a new navigation framework) may trigger a new build of the documentation.

A user can be allowed to edit the base text and/or markup in the constituent files so that the build process generates updated documentation. For example, a technical writer may be allowed to edit the text in an HTML format, with changes to the HTML made via an editing interface. Then, the changes can be converted to text with appropriate markup for use to apply formatting and add other elements during the build process. As another example, a user may be allowed to edit the tags and markup used to dynamically insert text (e.g., from WADL files) and/or apply formatting and layout if the user has sufficient permission.

The discussion above included examples of workflows for editing SDK definition and documentation files. However, the present subject matter can be utilized to define SDKs as well. For example, user interface component 222 may include a command for a user to create a new SDK rather than entering an existing SDK. As another example, new API definition pages can be generated within a new or existing SDK.

When a new SDK or element thereof is created, corresponding specification data can be set up using templates. For example, when creating a new SDK, a base set of constituent files for documenting the SDK can be created and a directory structure for defining WADL files can be created. A user can then create one or more new APIs for the SDK, with each newly-created API resulting in generation of a basic WADL file to be filled in by the user and/or others.

Aspects of the present subject matter will now be discussed in the context of exemplary user interfaces shown in FIGS. 6-8.

FIG. 6 is a diagram illustrating an example of an interface 600 for defining a new SDK. For example, interface 600 may be presented when a user provides a "new" command in an SDK selection interface. The build system may, for instance, maintain an initial login and selection screen where a user can login and then select an SDK and version. If a new SDK is to be defined, interface 600 can be used to specify mandatory and identifying portions of an API specification. In this example, interface 600 includes a field 602 for specifying a version, fields 604 for specifying a URL for publishing documentation, field 606 for specifying a port for use by the build system in managing files for the SDK, and username/password fields 608/610 for the build system. When the new SDK is to be created, the build system can access template files including default values for the non-mandatory settings to create a basic framework for defining APIs in the new SDK.

FIG. 7 is a diagram illustrating an example of an interface 700 for viewing/managing APIs and documentation of an SDK. For example, a user may select an existing SDK or encounter interface 700 once the framework for a new SDK is in place. In this example, interface 700 includes a button 702 for accessing a listing of versions of the SDK, a button 704 for triggering definition of a new API, and a button 706 for accessing documentation for the SDK as a whole. If a user selects documentation button 706, an interface listing documentation for the SDK as a whole can be provided with options similar to interface 708. If the user select button 704 to create a new API, a template can be used to generate a basic WADL file and then the WADL file can be used to provide an editing interface to define the API details.

As shown at 708, an interface listing a plurality of APIS ("AddRating", "CreateAcct", and "GetRating") is provided. The API name, title, and available actions are indicated. For example, a user may select "edit" to trigger the generation of an editing interface or "destroy" to remove the API entirely. The API name/title may be clickable to view the API documentation as currently published.

Figure 8:
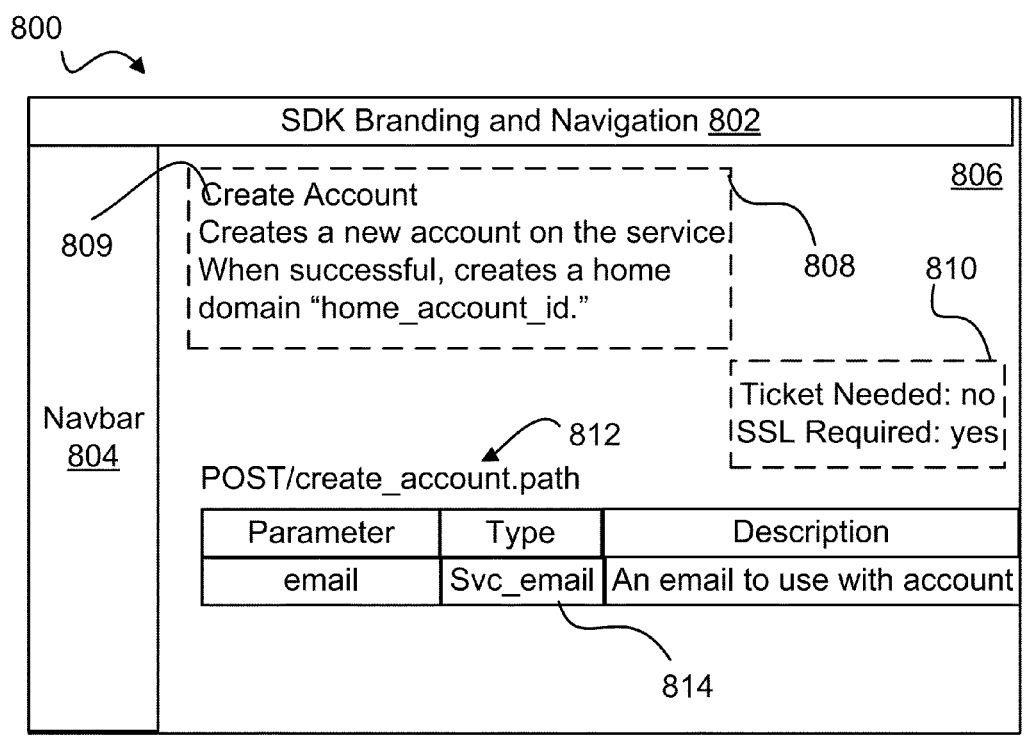
FIG. 8 is a diagram illustrating an exemplary interface with documentation information for an API.

FIG. 8 is a diagram illustrating an exemplary interface 800 presenting documentation information for an API. For instance, interface 800 may be presented when a user elects to view the "CreateAcct" API. Interface 800 may be reachable from the SDK documentation page without the need to use interface 700; for example, the SDK documentation pages may allow a user to drill down to documentation from an initial welcome page. The documentation management system has generated an HTML page including SDK branding and navigation header 802, which may feature the SDK name and a plurality of tabs for selecting various categories of documentation. This example also features a navigation bar 804 which may, for instance, include a link to documentation for various APIs.

Substantive content for the "CreatAcct" API is presented in main content area 806. A descriptive preamble 808 featuring title 809 and additional descriptive text provides a basic description of the "CreateAcct" API, including its formal title "Create Account." Another portion of content area 806 includes attribute list 810, which may correspond to API features or required attributes. In this example, the attributes are whether a ticket is needed or whether use of the API requires a secure socket layer (SSL). Content area 806 also includes an indicator 812 providing the syntax for invoking the API (a POST command passing "create_account.path") and a listing of parameters at 814. In this example, a single parameter "email" is listed by name, type, and with a brief description. In practice, parameter listing 814 can include any required or optional parameters, each of which may have additional information displayed.

Figure 9:
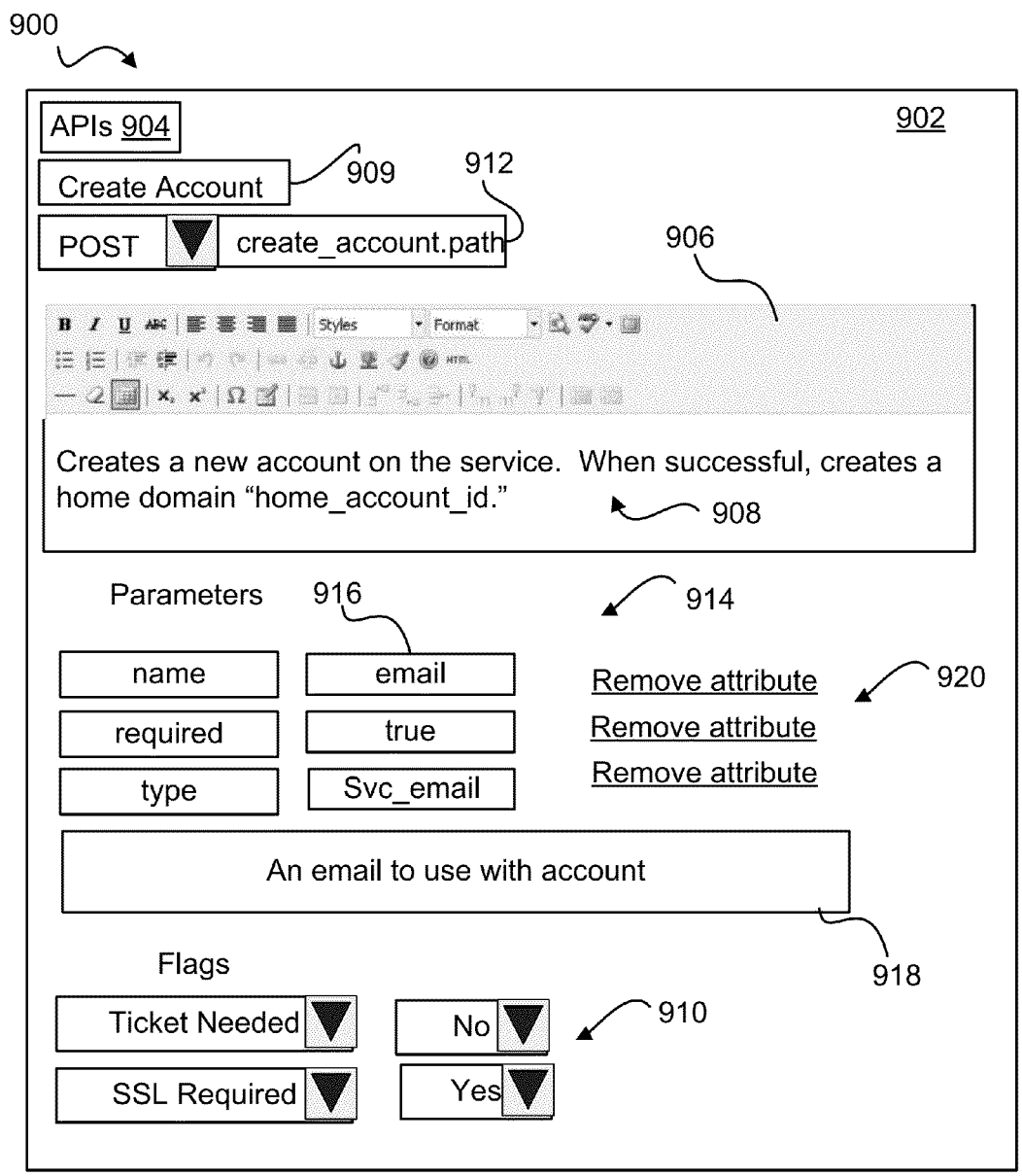
FIG. 9 is a diagram illustrating an exemplary editing interface for editing the API and documentation depicted in FIG. 8.

FIG. 9 is a diagram illustrating an exemplary editing interface 900 for editing the "CreateAcct" API and documentation depicted in FIG. 8. For example, if a user selected the "edit" command in interface 700, then interface 900 may be generated by parsing the WADL file and generating an HTML page. Interface 900 includes content area 902 and a number of interface elements. Button 904 may allow a user to return to the listing of APIs; for example, the user may be presented with a pop-up message asking whether to commit or discard changes.

Text field 909 allows the user to specify the title for the API; changes to the content of field 909 can result in changes to the underling WADL so that a new title is displayed at 809 and at 708 in interfaces 700 and 800, respectively. Interface element 912 includes a pull-down menu and text field for specifying the syntax for invoking the API. For example, the pull-down menu may be used to define a POST, PUT, GET, or other command, while the text field can be used to define the syntax for invoking the command. Changes at element 912 can result in changes to the documentation as shown at 812 and can also propagate out to code generation elements of the build system. Accordingly, interface element 912 may not be displayed to all users. For example, a technical writer may be able to view element 912 but may not be able to change the values thereof while a developer may be able to change all elements.

Interface 900 has been generated to include a text editor 906 in which text 908 is provided in a WYSIWYG manner— that is, the text as displayed at 908 appears in the same way it appears at 808 in the documentation. For example, HTML code for interface 900 can be generated so as to include Javascript or other code for providing the text editor. Another example of code for providing the text editor is a rich internet application, such as an Adobe® Flash® plug-in. Editor 906 can be configured to include spell-check functionality or to provide a call to the specification management system for spell checking as noted above. In some embodiments, the spell-checking can be based on a listing of parameter names and values for other portions of the API and/or other SDKs. For example, "home_account_id" may have been inserted in response to a user typing "home_acc" and selecting a completion suggestion if "home_account_id" is a previously-used term in another API or SDK.

Interface 900 includes a parameter editing portion 914 including a plurality of text fields 916, attribute editing commands 920, and text field 918. In this example, the text fields include attribute names ("name", "required", and "type") and fields for corresponding values ("email", "true", and "Svc_e-mail"). Text field 918 depicts the descriptive text associated with the parameter. In this example, a single parameter "email" is shown, although multiple instances of editing portion 914 can be included for each parameter, along with a title for each parameter. Other attribute editing commands include an "add" command for adding another attribute and attribute value. In some embodiments text fields 918 are provided with appropriate code (e.g., Javascript) for invoking AJAX functionality provided by the specification management system. For instance, if a user begins typing a parameter name or value, a listing of existing parameter names (or existing parameter values for a given name) can be consulted to provide a suggestion to the user.

Flag interface 910 includes drop down menus for setting flags used by the build system and/or documentation components. For instance, as was noted above, the "CreateAcct" API included an indication that a ticket is not needed, while SSL is required. These attributes may correspond to flags used by the build system in generating code. For example, the SSL flag may toggle configuration of client libraries generated by the build system to utilize HTTPS and HTTP requests.

As was mentioned above, a user can edit the descriptive and/or functional aspects of the API definition and then commit the changes. The HTML-as-edited can then be converted into XML for use in updating the WADL file corresponding to the API and an updated build can be triggered.

A similar workflow and interface can be presented for editing SDK documentation not tied to particular APIs. For example, as was noted above, documentation may be generated by constituent files that are combined with data extracted from the WADL files, such as constituent files providing descriptive text for a listing of all APIs where the contents of the listing are determined from the titles of all the WADL files for the SDK. The constituent files can be selected from an interface similar to that of FIG. 7 and then converted to HTML for editing in an interface similar to FIG. 9.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art.

An algorithm is here and generally is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method, comprising:
accessing specification data for a data service, wherein the specification data comprises a plurality of structured markup files each corresponding to an application programming interface provided by the data service;
identifying a portion of the specification data to be edited based on a tag type of the portion, a user role of a user, and permissions associated with the user role, wherein the portion of the specification data is a section of an individual file of the plurality of structured markup files;
converting the identified portion of the specification data from a first structured markup file format into a second structured markup file format;
generating a first interface or a second interface based at least in part on a restriction defined in a configuration file, the user role, and the permissions associated with the user role, the first generated interface and second generated interface utilized for editing the portion of the specification data in the second structured markup file format, the first generated interface configured for editing parameter values and parameter types related to functionality of the application programming interface that is different from the second generated interface that restricts use to editing descriptive aspects of the application programming interface based on a different user role;
presenting the first interface or the second interface to the user;
receiving first data via the first interface or second data via the second interface, the first data corresponding to edits for the parameter values and the parameter types, the second data corresponding to edits for the descriptive aspects of the application programming interface, the first data and the second data representing an edited version of the portion of specification data in the second structured markup file format; and
updating the specification data based on the received first data or the received second data.

2. The method set forth in claim 1, further comprising:
providing a plurality of web pages pertaining to the data service, the plurality of pages comprising at least one definition page corresponding to the application programming interface and at least one documentation page for the data service;
wherein identifying the portion of the specification data to be edited comprises receiving an edit command referencing (i) the definition page or (ii) the documentation page and, in response, selecting a portion of (i) the first structured markup file or the second structured markup file for the application programming interface corresponding to the definition page or a portion of (ii) a constituent element comprising text and markup for use in generating the documentation page.

3. The method set forth in claim 1, wherein the portion for editing comprises documentation for the data service embedded in the first structured markup file or the second structured markup file.

4. The method set forth in claim 1, wherein the first generated interface or the second generated interface for editing the specification data comprises an HTML page.

5. The method set forth in claim 4, wherein the HTML page includes an embedded text editor.

6. The method set forth in claim 4, wherein the HTML page comprises code for suggesting a parameter value for inclusion in the specification data.

7. The method set forth in claim 1, wherein the identifying of the portion includes parsing the specification data to identify one or more tag types editable by the user.

8. The method set forth in claim 1, further comprising triggering an automated build to update some or all components of the data service using the specification data as updated by the received first data.

9. A computer system comprising a processor with access to a computer readable medium, the computer readable medium tangibly embodying program components that configure operation of the computer system, the program components comprising:
- a user interface module configured to provide a plurality of web pages for a data service;
- a selection module configured to identify a portion of specification data of the data service for editing based on an Xpath expression and a user role of a user-Fele, wherein the specification data comprises a plurality of structured markup files each corresponding to an application programming interface provided by the data service, wherein the portion of the specification data is a section of an individual file of the plurality of structured markup files;
- a conversion module configured to parse the specification data and convert the portion from a first structured markup file format to a second structured markup file format;
- an editing interface module configured to provide a first interface or a second interface based at least in part on a restriction defined in a configuration file, the user role, and permissions associated with the user role, the first interface and second interface utilized to allow editing of the portion while in the second structured markup file format, the first interface configured for editing parameter values and parameter types related to functionality of the application programming interface that is different from the second interface that restricts use to editing descriptive aspects of the application programming interface based on a different user role; and
- a version control module configured to identify a desired change to the specification data based on receiving first data via the first interface or second data via the second interface and updating the specification data based on the received first data or the received second data, the first data corresponding to edits for the parameter values and the parameter types, the second data corresponding to edits for the descriptive aspects of the application programming interface, the first data and the second data representing an edited version of the portion of the specification data in the second structured markup file format.

10. The system set forth in claim 9, wherein the user interface module is configured to provide the plurality of web pages, the web pages comprising at least one definition page corresponding to the application programming interface and at least one documentation page for the data service;
wherein the selection module is responsive to selection of an edit command referencing the definition page to identify the portion corresponding to the application programming interface; and
wherein the selection module is responsive to selection of an edit command referencing the documentation page to identify the portion in a constituent element comprising text and markup for use by an automated build system in generating the documentation page.

11. The system set forth in claim 9, wherein the editing interface module is configured to generate an HTML page comprising an embedded text editor.

12. The system set forth in claim 11, wherein the editing interface module is configured to generate the HTML page so that the page includes code for suggesting a parameter value.

13. The system set forth in claim 9, wherein the user interface module is configured to receive data identifying the user.

14. The system set forth in claim 9, wherein the selection module is configured to create a new portion in specification data of the data service in response to input identifying a new application programming interface or a new documentation page.

15. A computer program product comprising non-transitory program code embodied in a computer-readable medium, the program code comprising:
- program code for accessing specification data for a data service, wherein the specification data comprises a plurality of structured markup files each corresponding to an application programming interface provided by the data service;
- program code for identifying a portion of the specification data to be edited based on a tag type of the portion, a user role of a user, and permissions associated with the user role, the portion defined in a first structured markup file format and comprising a section of an individual file of the plurality of structured markup files;
- program code for converting the identified portion of the specification data into a second structured markup file format;
- program code for generating a first interface or a second interface based at least in part on a restriction defined in a configuration file, the user role, and the permissions associated with the user role, the first generated interface and second generated interface utilized for editing the portion of the specification data in the second structured markup file format, the first generated interface configured for editing parameter values and parameter types related to functionality of the application programming interface that is different from the second generated interface that restricts use to editing descriptive aspects of the application programming interface based on a different user role;
- program code for presenting the first interface or the second interface to the user;
- program code for receiving first data via the first interface or second data via the second interface, the first data corresponding to edits for the parameter values and the parameter types, the second data corresponding to edits for the descriptive aspects of the application programming interface, the first data and the second data representing an edited version of the specification data in the second structured markup file format; and
- program code for updating the specification data based on the received first data or the received second data.

16. The computer program product set forth in claim 15, wherein the program code further comprises program code for providing a plurality of web pages pertaining to the data service, the plurality of pages comprising at least one definition page corresponding to the application programming interface and at least one documentation page for the data service; and
wherein identifying the portion of the specification data to be edited comprises receiving an edit command referencing (i) the definition page or (ii) the documentation page and, in response, selecting a portion of (i) the structured markup file for the application programming interface corresponding to the definition page or a portion of (ii) a constituent element comprising text and markup for use in generating the documentation page based at least in part on user permissions associated with the specification data.

17. The computer program product set forth in claim 15, wherein the first generated interface or the second generated interface for editing the specification data comprises an HTML page.

18. The computer program product set forth in claim 17, wherein the HTML page includes an embedded text editor.

19. The computer program product set forth in claim 15, further comprising:
   program code for responding to a request made by the interface for editing the specification data and requesting a suggested parameter value.

\* \* \* \* \*

UNITED STATES PATENT AND TRADEMARK OFFICE
CERTIFICATE OF CORRECTION

| | | |
|---|---|---|
| PATENT NO. | : 9,189,244 B2 | Page 1 of 1 |
| APPLICATION NO. | : 12/542964 | |
| DATED | : November 17, 2015 | |
| INVENTOR(S) | : Richard McMahon and Lea Savage | |

It is certified that error appears in the above-identified patent and that said Letters Patent is hereby corrected as shown below:

In the Claims

Column 17, Claim 9, Line 8

Delete "-Fele"

Signed and Sealed this
Eighth Day of March, 2016

Michelle K. Lee
*Director of the United States Patent and Trademark Office*